United States Patent [19]

Campbell et al.

[11] Patent Number: 5,181,294
[45] Date of Patent: Jan. 26, 1993

[54] SUPPORT AND MANIPULATION MECHANISM FOR LEAF AND DEBRIS COLLECTOR

[76] Inventors: Richard J. Campbell, 7059 Erie St.; George G. Miller, 10030 Sylvania-Metamora Rd.; Steven P. Venia, 4935 Arbor Way, all of, Sylvania, Ohio 43560

[21] Appl. No.: 732,901

[22] Filed: Jul. 19, 1991

[51] Int. Cl.$^5$ .............................................. A47L 5/36
[52] U.S. Cl. ........................................ 15/315; 15/339; 15/414
[58] Field of Search .................... 15/315, 414, 339; 248/75; 285/61

[56] References Cited

U.S. PATENT DOCUMENTS

| | | | |
|---|---|---|---|
| 2,663,894 | 12/1953 | Elliotte | 15/414 X |
| 2,748,236 | 5/1956 | Landis et al. | 248/75 X |
| 3,941,412 | 3/1976 | Carpenter | 248/75 X |
| 4,002,357 | 1/1977 | Bennett | 248/75 X |
| 4,019,219 | 4/1977 | Willenborg | 15/414 X |
| 4,158,462 | 6/1979 | Coral | 285/61 X |
| 4,199,837 | 4/1980 | Fisco | 15/315 X |
| 4,366,594 | 1/1983 | Hyams | 15/414 X |
| 4,541,327 | 9/1985 | Lundstrom | 248/75 X |
| 4,669,145 | 6/1987 | Kehr | 15/315 X |
| 4,995,138 | 2/1991 | Pullen | 15/414 X |

*Primary Examiner*—Chris K. Moore
*Attorney, Agent, or Firm*—Willian Brinks Olds Hofer Gilson & Lione

[57] ABSTRACT

An apparatus for the collection of leaves and debris by a vacuuming process is described which features an improved mechanism for supporting and manipulating an intake hose. A stationary support frame is mounted on a leaf collecting apparatus and a swing arm is pivotally attached to the support frame about a vertical axis. An intake hose cradle is fixed to the swing arm and supports the intake hose from underneath. The intake hose may be adjusted vertically by a hydraulic actuator (extensible piston) located on the swing arm which pivots about a horizontal axis in response to movement of the hydraulic actuator. Further, the intake hose may be manipulated from side-to-side by a handle attached to the intake end of the hose, the swing arm allowing lateral movement by utilizing bearings as pivot points along the vertical axis.

4 Claims, 2 Drawing Sheets

SUPPORT AND MANIPULATION MECHANISM FOR LEAF AND DEBRIS COLLECTOR

FIELD OF THE INVENTION

This invention relates to a leaf and debris collector which uses the vacuuming process as the primary method of collection. More specifically, this invention relates to the mechanism used to support and manipulate the intake hose of such a leaf and debris collector.

BACKGROUND OF THE INVENTION

A typical leaf and debris collector utilizes a vacuuming process to transfer leaves and debris from the ground through either flexible hose or through an intake nozzle/ductwork combination into a trailer or other storage container. The collector can be mounted on a trailer and towed during the collection process or mounted on a vehicle and driven along during collection.

On collectors utilizing ductwork as a flow path for leaves and debris, the position of the intake nozzle is usually fixed. However, a fixed intake nozzle is of limited utility since it cannot be adjusted vertically to accommodate leaf piles of varying height or uneven terrain. Also, fixed nozzles cannot be manipulated horizontally and therefore are limited to a narrow collection path. More versatile installations utilize flexible intake hoses to allow for varying conditions and to enhance mobility. Such leaf and debris collectors usually support the intake hose by an overhead boom. The boom is controlled by various means to manipulate the position of the mouth of the intake hose, both in a vertical direction and in a horizontal direction to enable the intake to "sweep" across a larger area. Because of the large size of the flexible hoses and the speed necessary to make the collection process efficient, the support and manipulation means must be strong enough to support large hoses and must be quick-acting and movable enough to quickly manipulate the hose mouth on both vertical and horizontal directions.

SUMMARY OF THE INVENTION

According to the present invention there is provided an improved support and manipulation mechanism for an intake hose of a leaf and debris collector which enhances intake hose movement in both the horizontal and vertical planes. Also, because the support and control mechanism is below the intake hose (as opposed to above), the invention has a low profile which provides additional overhead clearance during operation. Finally, a leaf and debris collector according to the present invention incorporates a swing arm which pivots about a vertical axis for lateral movement. Various pivoting means may be used, including but not limited to ball joints, or bearings and shafts. Both members of the swing arm are pivoted on a horizontal axis and the two members are joined together. One member of the swing arm is a hydraulic actuator or extensible piston which extends the swing arm, allowing the swing arm to pivot about the horizontal axes. An intake hose cradle is attached to the swing arm. When the swing arm is extended, the intake hose cradle is elevated along with the intake hose which rides in the intake hose cradle. The hydraulic actuator may be operated from a remote switch thus allowing manipulation of the intake hose at the point of collection, i.e. the mouth of the intake hose. Thus, the mouth of the intake hose is selectively moved up or down by the hydraulic actuator and swung horizontally from side to side.

For further understanding of the present invention and the objects thereof, attention is directed to the drawings and the following brief description thereof, to the detailed description of the preferred embodiment of the invention, and to the appended claims.

DESCRIPTION OF THE PREFERRED EMBODIMENT

Figure 1:
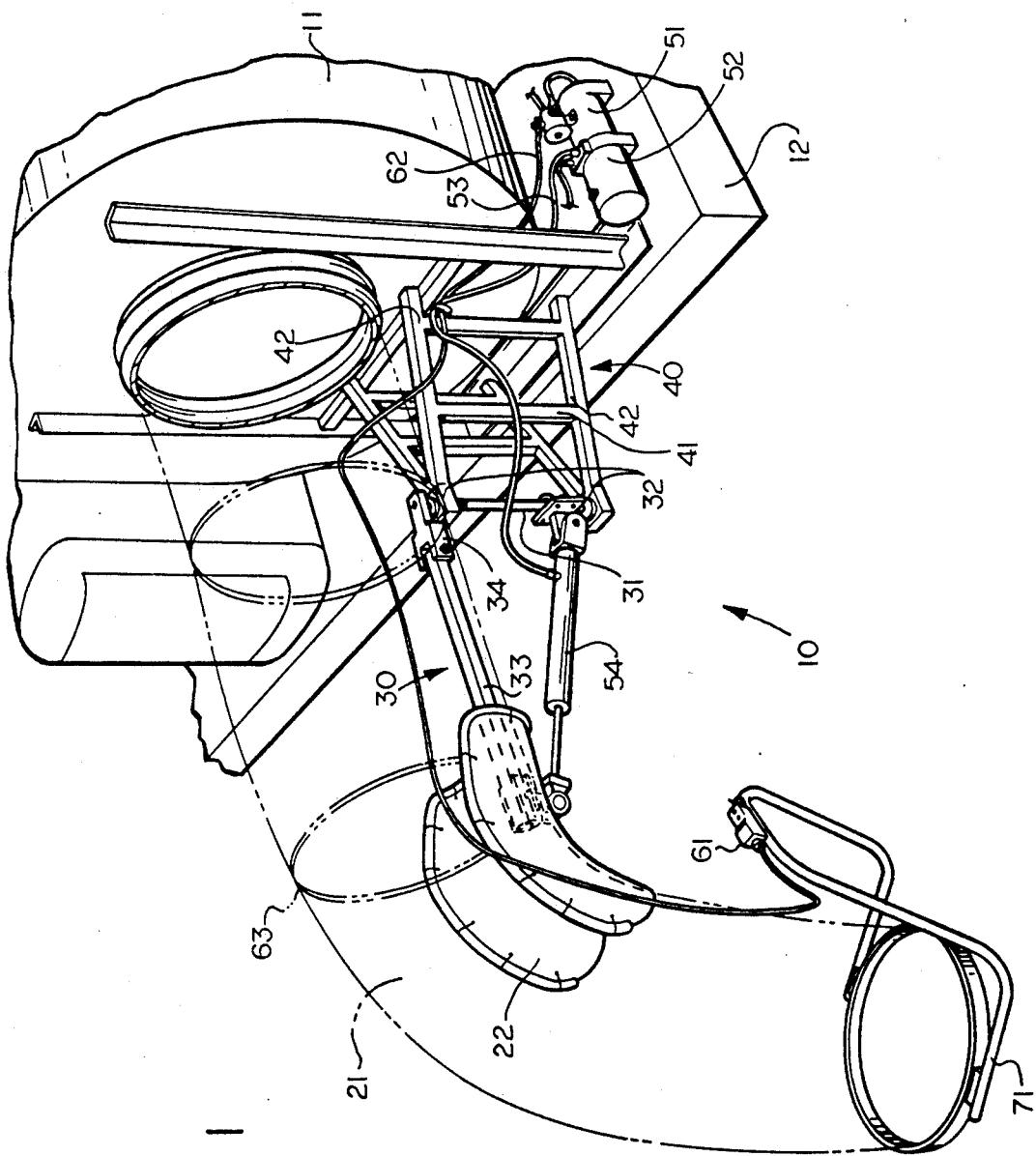
FIG. 1 is a side-rear perspective view of the invention with the intake hose cradle and hose in the half-raised position.
Figure 2:
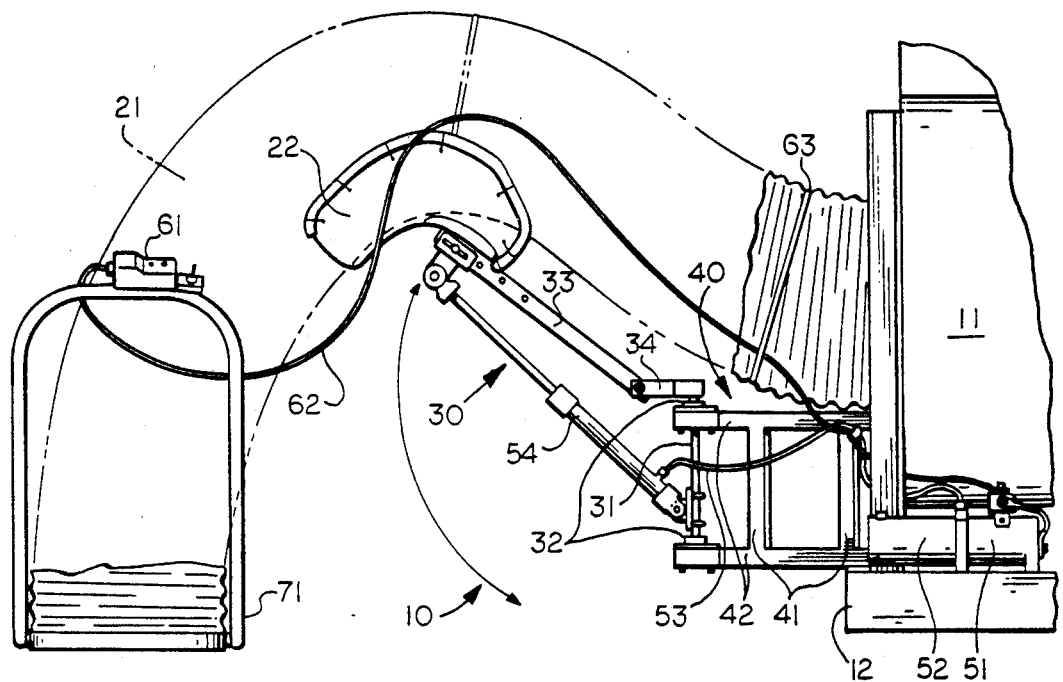
FIG. 2 is a side elevational view of the invention with the intake hose cradle and hose in the fully-raised position.
Figure 3:
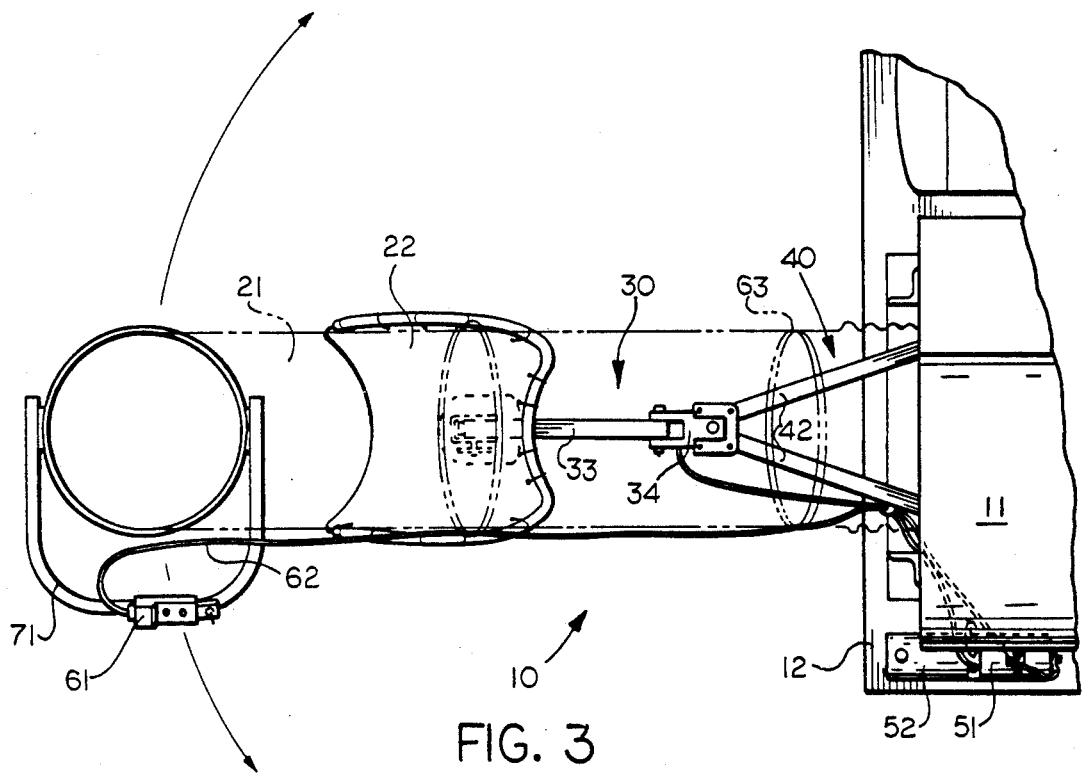
FIG. 3 is a top plan view of the invention.

The leaf and debris collector intake hose support and manipulation mechanism is generally indicated at 10 in FIG. 1 and can be mounted on a trailer or other vehicle, not shown. The support frame 40 consists of support members 41 and 42 connected in an A-frame configuration mounted to the vacuum tank 11 and the leaf and debris collector chassis 12 in a fixed, horizontal position.

In the preferred embodiment the pivot shaft 3 connects the horizontal members 42 of the support frame 40 at the vertices of the "A" utilizing bearings at pivot points 32 to allow lateral movement of the swing arm 30 which extends outwardly from the support frame 40.

The swing arm 30 employs a vertical pivot bracket 34 keyed to the upper swing arm member 33 and a hydraulic actuator 54, both of which are connected to opposite ends of the pivot shaft 31 at pivot points 32. The intake hose cradle 22 is fixed at the outermost end of the swing arm 30. The intake hose 21 (shown in phantom in these drawings) rests in the intake hose cradle 2 for support from underneath.

To raise the intake hose 21, a button is depressed on the remote hydraulic actuation switch 61, sending an electric signal through the hydraulic control cable 62 to the hydraulic pump/motor 51. Hydraulic fluid is then pumped through the hydraulic fluid line 53 to the hydraulic actuator 54 from the hydraulic fluid reservoir 52, whereby extending the hydraulic piston, causing the swing arm member 33 to pivot upward from the vertical pivot bracket 34, resulting in the raising of the intake hose cradle 22 and intake hose 21.

To lower the intake hose, another button on the remote hydraulic actuation switch 61 is depressed, sending a signal to the pump/motor 51 which causes the hydraulic fluid to "bleed off" from the hydraulic actuator 54 and back into the reservoir 52 due to the weight of the intake hose cradle 22 and intake hose 21.

To manipulate the intake hose 21 laterally it is simply pushed/pulled manually utilizing the intake hose control handle 71, causing the combination of the swing arm 30, the intake hose cradle 22, and the intake hose 21 to pivot about the pivot shaft 31.

The invention, thus described, provides an improved support and manipulation mechanism for a vacuum operated leaf and debris collector. Although the invention has been described with reference to specific example embodiments, it is intended to cover all modifications and equivalents within the scope of the appended claims.

What is claimed is:

1. In a machine used for collecting leaves and debris, a mechanism for the support and manipulation of an intake hose, comprising:

a fixed support frame, said support frame having horizontal support members being mounted on a chassis of a leaf and debris collector and providing a fixed vertical bearing surface including a pivot shaft;

a swing arm, said swing arm extending horizontally from said support frame, said swing arm comprising an upper swing arm member pivoting about a horizontal axis keyed to a vertical pivot bracket, said upper swing arm member being fixed at one end to the upper pivot point of said pivot shaft and being at the other end fixed to an intake hose cradle;

means for pivoting said swing arm, said pivoting means comprising said pivot shaft having a bearing at both the upper and lower ends, said pivot shaft pivotally linking said swing arm with said support frame;

an intake hose cradle, said intake hose cradle fixed to the outermost end of said swing arm, said intake hose cradle used to support an intake hose from underneath; and means for manipulating such intake hose, said hose manipulation means being for controlling the movement of said intake hose in both the horizontal and vertical planes.

2. The mechanism of claim 1 wherein said swing arm further comprises a lower swing arm member, said lower swing arm member comprising a hydraulic actuator being fixed at one end to the lower pivot point of said pivoting shaft and being fixed at the other end to said intake hose cradle.

3. The mechanism of claim 1 wherein said intake hose cradle is comprised of a plurality of arcuate sections of rigid material joined together to form an angular support cradle, having all exposed edges surrounded by a protective cover to avoid damage to the intake hose.

4. The mechanism of claim 1 wherein said hose manipulating means comprises:

a hydraulic system, said hydraulic system for raising/lowering an intake hose;

an intake hose control handle, said handle used for manually manipulating an intake hose in a lateral direction; and a remote hydraulic actuation switch, said switch used to operate said hydraulic system from a remote location.

* * * * *